United States Patent
Dong et al.

(10) Patent No.: US 10,386,669 B2
(45) Date of Patent: Aug. 20, 2019

(54) DISPLAY SUBSTRATE AND MANUFACTURING METHOD THEREOF AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Tingze Dong, Beijing (CN); Peiqiang Guan, Beijing (CN); Xing Qin, Beijing (CN); Jun Mo, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 22 days.

(21) Appl. No.: 15/148,292

(22) Filed: May 6, 2016

(65) Prior Publication Data
US 2017/0059924 A1    Mar. 2, 2017

(30) Foreign Application Priority Data
Sep. 1, 2015  (CN) .......................... 2015 1 0552694

(51) Int. Cl.
*G02F 1/1335*    (2006.01)

(52) U.S. Cl.
CPC .. *G02F 1/133512* (2013.01); *G02F 1/133514* (2013.01); *G02F 2201/501* (2013.01)

(58) Field of Classification Search
CPC ......... G02F 2201/501; G02F 1/133512; G02F 1/13439; G02F 1/136209;
(Continued)

(56) References Cited

U.S. PATENT DOCUMENTS 5,358,810 A   10/1994  Yoshino
5,633,739 A    5/1997  Matsuyama et al.
(Continued)

FOREIGN PATENT DOCUMENTS

CN   1514280 A    7/2004
CN   101153933 A  4/2008
CN   101738781 A  6/2010

OTHER PUBLICATIONS

First Office Action dated Jul. 27, 2017 in corresponding Chinese Patent Application No. 201510552694.4.

*Primary Examiner* — Jade R Chwasz
(74) *Attorney, Agent, or Firm* — Nath, Goldberg & Meyer; Joshua B. Goldberg

(57) ABSTRACT

Provided is a display substrate and a manufacturing method thereof a display panel and a display device. The display substrate comprises: a base substrate, and black matrixes, color filters and a blocking layer provided above the base substrate, the blocking layer being provided above the black matrixes and the color filters and being configured to block diffusion of particles generated by the color filters and/or the black matrixes. In the solutions of the display substrate and a manufacturing method thereof and a display device provided in the present application, the blocking layer is provided above the black matrixes and the color filters, and can block the particles generated by the color filters and/or the black matrixes, preventing the generated particles from diffusing to the opposite substrate facing the display substrate, generation of the progressive Zara can be prevented.

11 Claims, 2 Drawing Sheets

(58) Field of Classification Search
CPC ... G02F 2001/136295; G02F 1/133514; G02F 1/133509; G02B 5/003; G02B 5/20; G02B 5/201
USPC .......................................... 359/892, 891, 885
See application file for complete search history.

(56) References Cited

U.S. PATENT DOCUMENTS

| | | |
|---|---|---|
| 6,759,172 B2 | 7/2004 | Huh et al. |
| 8,941,617 B2 | 1/2015 | Koyama et al. |
| 2014/0063413 A1* | 3/2014 | Kim .................. G02F 1/133504 349/65 |
| 2014/0176491 A1* | 6/2014 | Zhao .................... G06F 3/0412 345/174 |

* cited by examiner

DISPLAY SUBSTRATE AND MANUFACTURING METHOD THEREOF AND DISPLAY DEVICE

FIELD OF THE INVENTION

The present application relates to the field of display technology, and particularly to a display substrate and a manufacturing method thereof, a display panel and a display device.

BACKGROUND OF THE INVENTION

A liquid crystal display device may include a color filter substrate and an array substrate which are provided oppositely. The color filter substrate includes a base substrate and black matrixes and color filters provided above the base substrate, wherein the color filters include R, G or B color filters and are made of resin.

Progressive small bright point (Zara) is a serious quality defect in the current Photo Alignment (OA) process of the liquid crystal display device and may remarkably affect the image quality of the display device. The progressive Zara has a low detection rate in the electric detection and module detection and is progressive, resulting in serious quality defect at the customer terminal, and in turn resulting in serious quality problem in the terminal market. The reason is in that during heating with high temperature in the OA process, the resin material of the color filter in the color filter substrate is denatured due to the high temperature so as to generate minute particles, these minute particles may be diffused to the surface of the array substrate, and after the minute particles are accumulated for a certain time period, the progressive Zara may be caused. The defect is progressive, so it is called progressive Zara.

SUMMARY OF THE INVENTION

The present application provides a display substrate and a manufacturing method thereof and a display device, which can prevent the progressive Zara from occurring.

To realize the above object, the present application provides a display substrate, comprising a base substrate, and black matrixes, color filters and a blocking layer provided above the base substrate, the blocking layer being provided above the black matrixes and the color filters and being configured to block diffusion of particles generated by the color filters and/or the black matrixes.

Optionally, the display substrate further comprises a protection layer provided above the blocking layer.

Optionally, the blocking layer is made of a transparent metal oxide.

Optionally, a thickness of the blocking layer is 400 Å to 600 Å.

Optionally, the blocking layer is made of a transparent inorganic non-metallic material.

Optionally, a thickness of the blocking layer is 1000 Å to 2000 Å.

To realize the above object, the present application provides a display panel, comprising an opposite substrate and the above display substrate which are provided oppositely.

Optionally, the display substrate is a color filter substrate, and the opposite substrate is an ADvanced Super Dimension Switch array substrate or an In-Plane-Switching array substrate.

To realize the above object, the present application provides a display device, comprising the above display panel.

To realize the above object, the present application provides a manufacturing method of a display substrate, comprising:

forming black matrixes and color filters above a base substrate; and forming a blocking layer above the base substrate, wherein the blocking layer is provided above the black matrixes and the color filters and is configured to block diffusion of particles generated by the color filters and/or the black matrixes.

Optionally, the manufacturing method of the display substrate further comprises:

forming a protection layer above the base substrate, wherein the protection layer is provided above the blocking layer.

The present application has the following advantages: according to the solutions of the display substrate and the manufacturing method thereof, the display panel and the display device provided in the application, the blocking layer is provided above the black matrixes and the color filters, and can block the particles generated by the color filters and/or the black matrixes, avoiding the generated particles from diffusing to the opposite substrate facing the display substrate, and thus generation of the progressive Zara can be prevented.

DETAILED DESCRIPTION OF THE EMBODIMENTS

To make those skilled in the art better understand solutions in the present application, the display substrate and the manufacturing method thereof, the display panel and the display device provided in the application will be described in details below in conjunction with the accompanying drawings.

Figure 1:
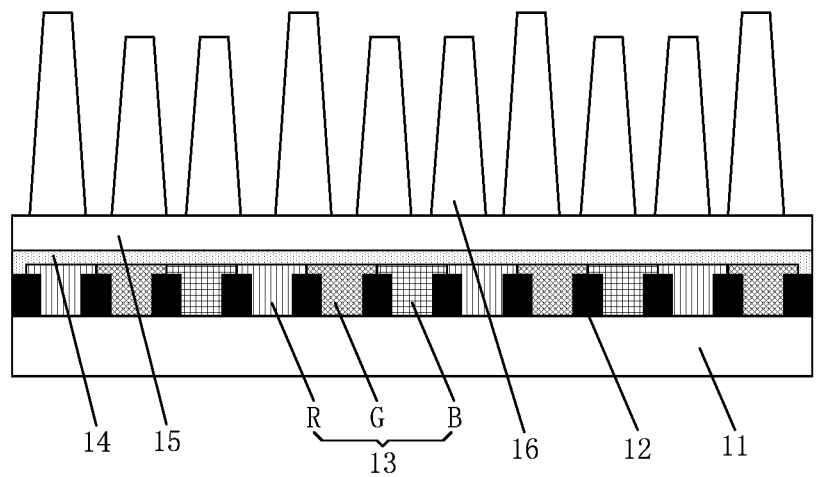
FIG. 1 is a structural diagram of a display substrate provided by a first embodiment of the present application.

FIG. 1 is a structural diagram of a display substrate provided by a first embodiment of the present application, as shown in FIG. 1, the display substrate comprises a base substrate 11, and black matrixes 12, color filters 13 and a blocking layer 14 provided above the base substrate 11, the blocking layer 14 being provided above the black matrixes 12 and the color filters 13 and being configured to block diffusion of particles generated by the color filters 13 and/or the black matrixes 12, so as to prevent the generated particles from diffusing to an opposite substrate which is provided opposite to the display substrate.

In the present embodiment, in a case that only the color filters 13 generate the particles when heating with a high temperature, the blocking layer 14 is configured to block the particles generated by the color filters 13 to prevent the particles generated by the color filters 13 from diffusing to the opposite substrate facing the display substrate; in a case that only the black matrixes 12 generate the particles when heating with a high temperature, the blocking layer 14 is configured to block the particles generated by the black matrixes 12 to prevent the particles generated by the black matrixes 12 from diffusing to the opposite substrate facing the display substrate; in a case that both the color filters 13 and the black matrixes 12 generate the particles when heating with a high temperature, the blocking layer 14 is configured to block the particles generated by the color filters 13 and the black matrixes 12 to prevent the particles generated by the color filters 13 and the black matrixes 12 from diffusing to the opposite substrate facing the display substrate.

In the present embodiment, the color filter 13 may be a red filter R, a green filter G or a blue filter B, and a plurality of color filters 13 formed on the base substrate 11 may include the red filters R, the green filters G and the blue filters B. In practical applications, the color filter 13 may be other color filter, which will not be described one by one herein.

Optionally, the display substrate may further comprise a protection layer 15. The protection layer 15 is provided above the blocking layer 14.

Optionally, the blocking layer 14 is made of a transparent metal oxide. For example, the metal oxide may include Indium Tin Oxide (ITO) or Indium Zinc Oxide (IZO). When the blocking layer 14 is made of a transparent metal oxide, a thickness of the blocking layer 14 is 400 Å to 600 Å.

Optionally, the blocking layer 14 is made of a transparent inorganic non-metallic material. For example, the transparent inorganic non-metallic material may include PVX. When the blocking layer 14 is made of a transparent inorganic non-metallic material, a thickness of the blocking layer 14 is 1000 Å to 2000 Å.

Optionally, the display substrate may further comprise spacers 16. The spacers 16 are provided above the protection layer 15.

In the present embodiment, the display substrate and the opposite substrate, which are oppositely provided, constitute a display device, wherein the display substrate is a color filter substrate, and the opposite substrate is an array substrate.

In the present embodiment, the color filter 13 is made of an organic material, for example, a resin.

When the display device is heated with a high temperature in the OA process, the material of the color filters 13 is denatured and generates minute particles, the generated minute particles diffuse to the opposite substrate. Since the blocking layer 14 is formed above the color filters 13 and blocks the minute particles, so that the particles generated by the color filters 13 can be prevented from diffusing to the opposite substrate facing the display substrate. When the display device is heated with a high temperature in the OA process, the material of the black matrixes 12 is denatured and generates minute particles, the generated minute particles diffuse to the opposite substrate. Since the blocking layer 14 is formed above the black matrixes 12 and blocks the minute particles, so that the particles generated by the black matrixes 12 can be prevented from diffusing to the opposite substrate facing the display substrate.

In the technical solution of the display substrate provided in the present embodiment, the blocking layer is provided above the black matrixes and the color filters, and can block diffusion of particles generated by the color filters and/or the black matrixes, preventing the generated particles from diffusing to the opposite substrate facing the display substrate, generation of the progressive Zara can be prevented, and thus the quality of the product can be improved. Since the blocking layer can block diffusion of particles generated by the color filters and/or the black matrixes, the solution in the present embodiment can enable the temperature in the high temperature heating process to be increased, that is, the process margin of the high temperature heating process can be increased.

A preferred embodiment of the present invention provides a display panel, which comprises an opposite substrate and a display substrate which are provided oppositely, and the display substrate is a color filter substrate, and the opposite substrate is an array substrate. The array substrate may be an ADvanced Super Dimension Switch (ADS) array substrate or an In-Plane-Switching (IPS) array substrate.

The preferred embodiment is not shown in drawings, but it will be described below in conjunction with an implementation of a display device in a second embodiment.

A second embodiment of the present application provides a display device, which comprises the above display panel, and the display panel includes an opposite substrate and a display substrate which are provided oppositely.

The display substrate is a color filter substrate, and the opposite substrate is an array substrate. The array substrate may be an ADvanced Super Dimension Switch (ADS) array substrate or an In-Plane-Switching (IPS) array substrate.

In the technical solution of the display device provided in the present embodiment, the blocking layer is provided above the black matrixes and the color filters, and can block the particles generated by the color filters and/or the black matrixes, preventing the generated particles from diffusing to the opposite substrate facing the display substrate, generation of the progressive Zara can be prevented, and thus the quality of the product can be improved. Since the blocking layer may block diffusion of particles generated by the color filters and/or the black matrixes, the solution in the present embodiment can enable the temperature in the high temperature heating process to be increased, that is, the process margin of the high temperature heating process can be increased.

Figure 2:
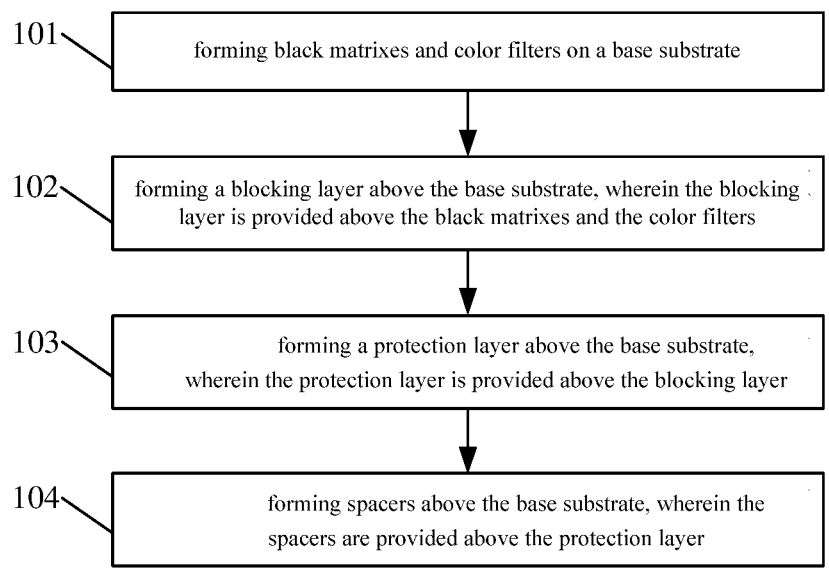
FIG. 2 is a flowchart of a manufacturing method of a display substrate provided by a third embodiment of the present application.

FIG. 2 is a flowchart of a manufacturing method of a display substrate provided by a third embodiment of the present application, as shown in FIG. 2, the manufacturing method comprises:

step 101, forming black matrixes and color filters on a base substrate.

Figure 3A:
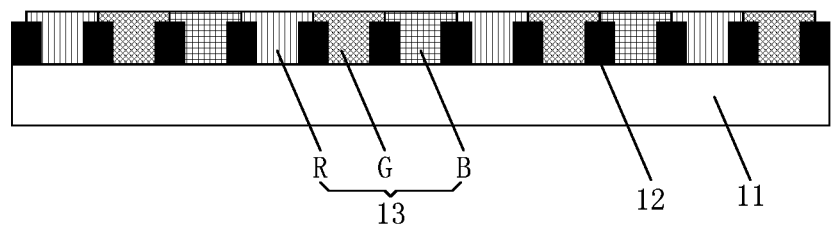
FIG. 3a is a diagram illustrating formation of black matrixes and color filters in the third embodiment.

FIG. 3a is a diagram illustrating formation of black matrixes and color filters in the third embodiment, as shown in FIG. 3a, the step 101 may specifically comprises:

step 1011, forming a material layer for the black matrixes on the base substrate 11, and performing a patterning process on the material layer for the black matrixes to form black matrixes 12;

step 1012, forming a material layer for the color filters on the base substrate 11, and performing a patterning process on the material layer for the color filters to form the color filters 13.

In the present embodiment, the color filter 13 may be a red filter R, a green filter G or a blue filter B, a plurality of color filters 13 are formed on the base substrate 11, the color filters 13 include red filters R, green filters G and blue filters B. The step 1012 may further comprise:

step 1012a, forming a material layer for the red filters on the base substrate 11, and performing a patterning process on the material layer for the red filters to form the red filters R;

step 1012b, forming a material layer for the green filters on the base substrate 11, and performing a patterning process on the material layer for the green filters to form the green filters G; and step 1012c, forming a material layer for the blue filters on the base substrate 11, and performing a patterning process on the material layer for the blue filters to form the blue filters B.

Step 102, forming a blocking layer above the base substrate, wherein the blocking layer is provided above the black matrixes and the color filters and is configured to block the particles generated by the color filters and/or the black matrixes, preventing the generated particles from diffusing to the opposite substrate facing the display substrate.

Figure 3B:
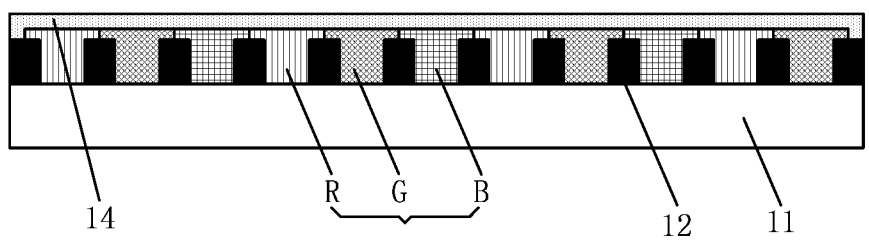
FIG. 3b is a diagram illustrating formation of a blocking layer in the third embodiment.

FIG. 3b is a diagram illustrating formation of a blocking layer in the third embodiment, as shown in FIG. 3b, the blocking layer 14 is formed above the base substrate 11 and covers the entire base substrate 11, and thus is provided above the black matrixes 12 and the color filters 13.

Step 103, forming a protection layer above the base substrate, wherein the protection layer is provided above the blocking layer.

Figure 3C:
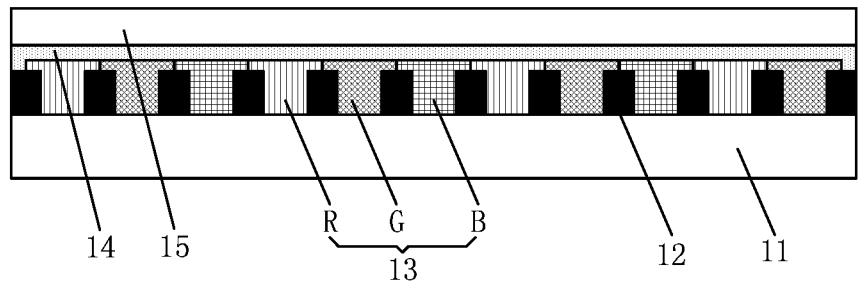
FIG. 3c is a diagram illustrating formation of a protection layer in the third embodiment.

FIG. 3c is a diagram illustrating formation of a protection layer in the third embodiment, as shown in FIG. 3c, the protection layer 15 is formed above the base substrate 11 and covers the entire base substrate 11, and thus is provided above the blocking layer 14.

Step 104, forming spacers above the base substrate, wherein the spacers are provided above the protection layer.

As shown in FIG. 1, the spacers 16 are formed above the base substrate 11 and are provided above the protection layer 15.

In the display substrate manufactured using the manufacturing method of the display substrate provided in the present embodiment, the blocking layer is provided above the black matrixes and the color filters, and can block the particles generated by the color filters and/or the black matrixes, preventing the generated particles from diffusing to the opposite substrate facing the display substrate, generation of the progressive Zara can be prevented, and thus the quality of the product can be improved. Since the blocking layer can block diffusion of particles generated by the color filters and/or the black matrixes, the solution in the present embodiment can enable the temperature in the high temperature heating process to be increased, that is, the process margin of the high temperature heating process can be increased.

It can be understood that the foregoing implementations are merely exemplary implementations used for describing the principle of the present application, but the present application is not limited thereto. Those of ordinary skill in the art may make various variations and improvements without departing from the spirit and essence of the present application, and these variations and improvements shall fall into the protection scope of the present application.

The invention claimed is:

1. A display panel, comprising an array substrate, a color filter substrate and a liquid crystal layer provided between the array substrate and the color filter substrate, wherein the color filter substrate comprises:
    a base substrate,
    black matrixes and color filters provided above the base substrate,
    a blocking layer, which is provided above the black matrixes and the color filters and between the array substrate and the black matrixes and the color filters, and the blocking layer is configured to block diffusion of particles generated by the color filters and/or the black matrixes,
    a protection layer, which is directly provided on and in contact with a surface of the blocking layer away from the base substrate and located between the array substrate and the blocking layer, and
    a spacer, which is directly formed on and in contact with a surface of the protection layer away from the blocking layer and located between the protection layer and the array substrate.

2. The display panel of claim 1, wherein the blocking layer is made of a transparent metal oxide.

3. The display panel of claim 2, wherein a thickness of the blocking layer is 400 Å to 600 Å.

4. The display panel of claim 1, wherein the blocking layer is made of a transparent inorganic non-metallic material.

5. The display panel of claim 4, wherein a thickness of the blocking layer is 1000 Å to 2000 Å.

6. The display panel of claim 1, wherein the array substrate is an Advanced Super Dimension Switch array substrate or an In-Plane-Switching array substrate.

7. A display device, comprising the display panel of claim 1.

8. The display device of claim 7, wherein the blocking layer is made of a transparent metal oxide.

9. The display device of claim 8, wherein a thickness of the blocking layer is 400 Å to 600 Å.

10. The display device of claim 9, wherein the blocking layer is made of a transparent inorganic non-metallic material.

11. A manufacturing method of a display panel, wherein the display panel comprises an array substrate, a color filter substrate and a liquid crystal layer provided between the array substrate and the color filter substrate, wherein the color filter substrate comprises a base substrate, and wherein the manufacturing method comprises:
    forming black matrixes and color filters above the base substrate,
    forming a blocking layer above the base substrate, wherein the blocking layer is provided above the black matrixes and the color filters, and between the array substrate and the black matrixes and the color filters, and the blocking layer is configured to block diffusion of particles generated by the color filters and/or the black matrixes,
    forming a protection layer directly on a surface of the blocking layer away from the base substrate and between the array substrate and the blocking layer, the protection layer being in contact with the surface of the blocking layer away from the base substrate; and
    forming a spacer directly on a surface of the protection layer away from the blocking layer and between the protection layer and the array substrate, the spacer being in contact with the surface of the protection layer away from the blocking layer.

* * * * *